US006751275B2

United States Patent
Iemura (10) Patent No.: US 6,751,275 B2
(45) Date of Patent: Jun. 15, 2004

(54) DEMODULATOR AND RADIO COMMUNICATION SYSTEM USING THE SAME

(75) Inventor: Takaya Iemura, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 10/058,908

(22) Filed: Jan. 30, 2002

(65) Prior Publication Data

US 2002/0101940 A1 Aug. 1, 2002

(30) Foreign Application Priority Data

Jan. 31, 2001 (JP) ........................................ 2001-023948

(51) Int. Cl.[7] ............................................... H03D 1/04
(52) U.S. Cl. ..................................................... 375/346
(58) Field of Search .................................. 375/316, 346, 375/285, 296, 219, 279, 280, 329, 331, 297, 340; 329/304; 332/103

(56) References Cited

U.S. PATENT DOCUMENTS 6,088,402 A * 7/2000 White ........................ 375/326
6,487,261 B2 * 11/2002 Iwamatsu et al. ........... 375/346

FOREIGN PATENT DOCUMENTS

| JP | 4-291829 A | 10/1992 |
| JP | 6-152676 A | 5/1994 |
| JP | 8-163198 A | 6/1996 |
| JP | 9-214578 | 8/1997 |
| JP | 10-233811 | 9/1998 |
| JP | 11-136302 A | 5/1999 |
| JP | 2000-232493 | 8/2000 |
| JP | 2000-349840 | 12/2000 |

* cited by examiner

Primary Examiner—Tesfaldet Bocure
(74) Attorney, Agent, or Firm—Sughrue Mion, PLLC (57) ABSTRACT

A demodulator for a radio communication system of the present invention includes a demodulator for demodulating an input modulated wave to thereby output a demodulated signal. A signal point position detector detects the signal point position of the demodulated signal on orthogonal coordinates. An error detector detects the shift of the signal point position detected and the original signal point position of the demodulated signal. An outputting circuit outputs first information representative of the shift and second information representative of the signal point position. A generating circuit generates compensation information in accordance with the first information and second information. An adding circuit adds the compensation information to the demodulated signal to thereby output a sum signal. The sum signal is output from the demodulator as a distortion-compensated signal.

16 Claims, 8 Drawing Sheets

DEMODULATOR AND RADIO COMMUNICATION SYSTEM USING THE SAME

BACKGROUND OF THE INVENTION

1. Field of the Invention

The present invention relates to a demodulator included in, e.g., a digital radio communication system for compensating for nonlinear distortion ascribable to an amplifier and a radio communication system using the same.

2. Description of the Background Art

It is a common practice with a demodulator included in a digital ratio communication system to compensate for nonlinear distortion. Japanese Patent Laid-Open Publication No. 11-136302, for example, pertains to a distortion compensating circuit of the type using an envelope detection type of linearizer. This type of linearizer compares the amplitude and phase of a digital signal to be sent and those of a signal fed back to thereby estimate the distortion of an amplifier, and then executes predistortion processing with the signal to be sent for thereby compensating for distortion. The circuit taught in the above document detects and compensates for the deviation of the gain of an orthogonal modulator and modulates with the orthogonal modulator four points of data inclined by 45° relative to an I and a Q axis in baseband. The circuit then reads the resulting output of the orthogonal modulator with a linear detector and then performs calculation with the read output for thereby compensating for the error of the orthogonal modulator in the degree of orthogonality.

Japanese Patent Laid-Open Publication No. 8-163198 discloses a nonlinear distortion compensating device for compensating for distortion to which a signal modulated by a transmitter is subjected before it is demodulated by a receiver. The compensating device determines mean signal points with a mean signal point position calculating circuit and then identifies a signal point corresponding to a mean signal point position that is closest to an input signal point.

Further, Japanese Patent Laid-Open Publication No. 4-291829 proposes a system for compensating for nonlinear distortion ascribable to an amplifier even when the phase of a modulated wave varies. For this purpose, the system obtains the shift of the modulation phase of a modulator beforehand with respect to a factor that causes the phase of an amplified modulated wave to vary. The system then compensates for the shift of the modulation phase in accordance with the variation of the above factor.

However, the conventional compensation schemes described above cannot sufficiently compensate for nonlinear distortion, as will be described specifically later.

Technologies relating to the present invention are also disclosed in, e.g., Japanese. Patent Laid-Open Publication No. 6-152676.

SUMMARY OF THE INVENTION

It is an object of the present invention to provide a demodulator capable of compensating for nonlinear distortion with simple circuitry without making design sophisticated and a radio communication system using the same.

It is another object of the present invention to provide a demodulator capable of making, even when nonlinear distortion characteristics vary due to the modification of an amplifier included in, e.g., a communication apparatus, redesigning of a modulator or a demodulator needless and surely executing distortion compensation, and a radio communication system using the same.

A demodulator for a radio communication system of the present invention includes a demodulator for demodulating an input modulated wave to thereby output a demodulated signal. A signal point position detector detects the signal point position of the demodulated signal on orthogonal coordinates. An error detector detects the shift of the signal point position detected and the original signal point position of the demodulated signal. An outputting circuit outputs first information representative of the shift and second information representative of the signal point position. A generating circuit generates compensation information in accordance with the first information and second information. An adding circuit adds the compensation information to the demodulated signal to thereby output a sum signal. The sum signal is output from the demodulator as a distortion-compensated signal.

BRIEF DESCRIPTION OF THE DRAWINGS

The above and other objects, features and advantages of the present invention will become more apparent from the following detailed description taken with the accompanying drawings in which.

DESCRIPTION OF THE REFERRED EMBODIMENT

Figure 1:
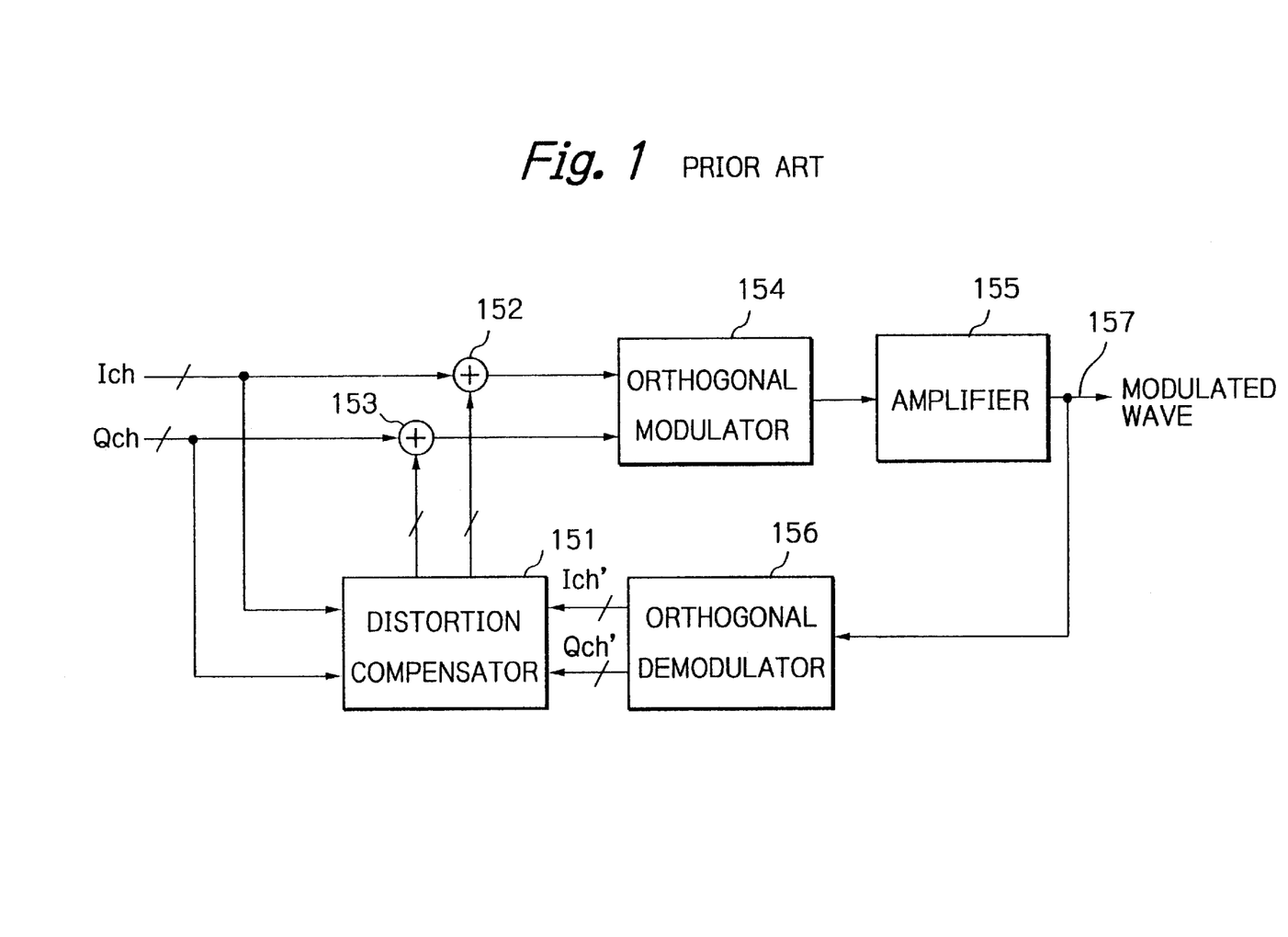
FIG. 1 is a schematic block diagram showing a conventional transmitter with a nonlinear distortion compensating capability.

To better understand the present invention, brief reference will be made to a conventional transmitter with a nonlinear distortion compensation capability. As shown, the transmitter includes a distortion compensator 151, adders 152 and 153, an orthogonal modulator 154, an amplifier 155, and an orthogonal demodulator 156. Baseband signals Ich and Qch are modulated by the orthogonal modulator 154 and then input to the amplifier 155. Usually, nonlinear distortion ascribable to the amplifier 155 influences the resulting amplified signal 157 output from the amplifier 155. The orthogonal demodulator 156 demodulates the modulated wave 157 output from the amplifier 155 to thereby produce signals Ich' and Qch'.

The distortion compensator 151 compares the baseband signals Ich and Qch to be input to the orthogonal modulator 154 and the signals Ich' and Qch' output from the amplifier 155, thereby detecting nonlinear distortion components. The adders 152 and 153 respectively add the baseband signals Ich and Qch and the compensated signals output from the distortion compensator 151, so that the output of the amplifier 155 has the nonlinear distortion compensated for.

The conventional transmitter, however, uses the orthogonal demodulator 156 only for compensating for nonlinear distortion and is therefore high cost. Moreover, an additional analog circuit extending from the amplifier 155 to the orthogonal modulator 156 results in sophisticated design. This is also true with the technologies taught in Japanese Patent Laid-Open Publication Nos. 11-136302 and 4-291829 discussed earlier.

Figure 2:
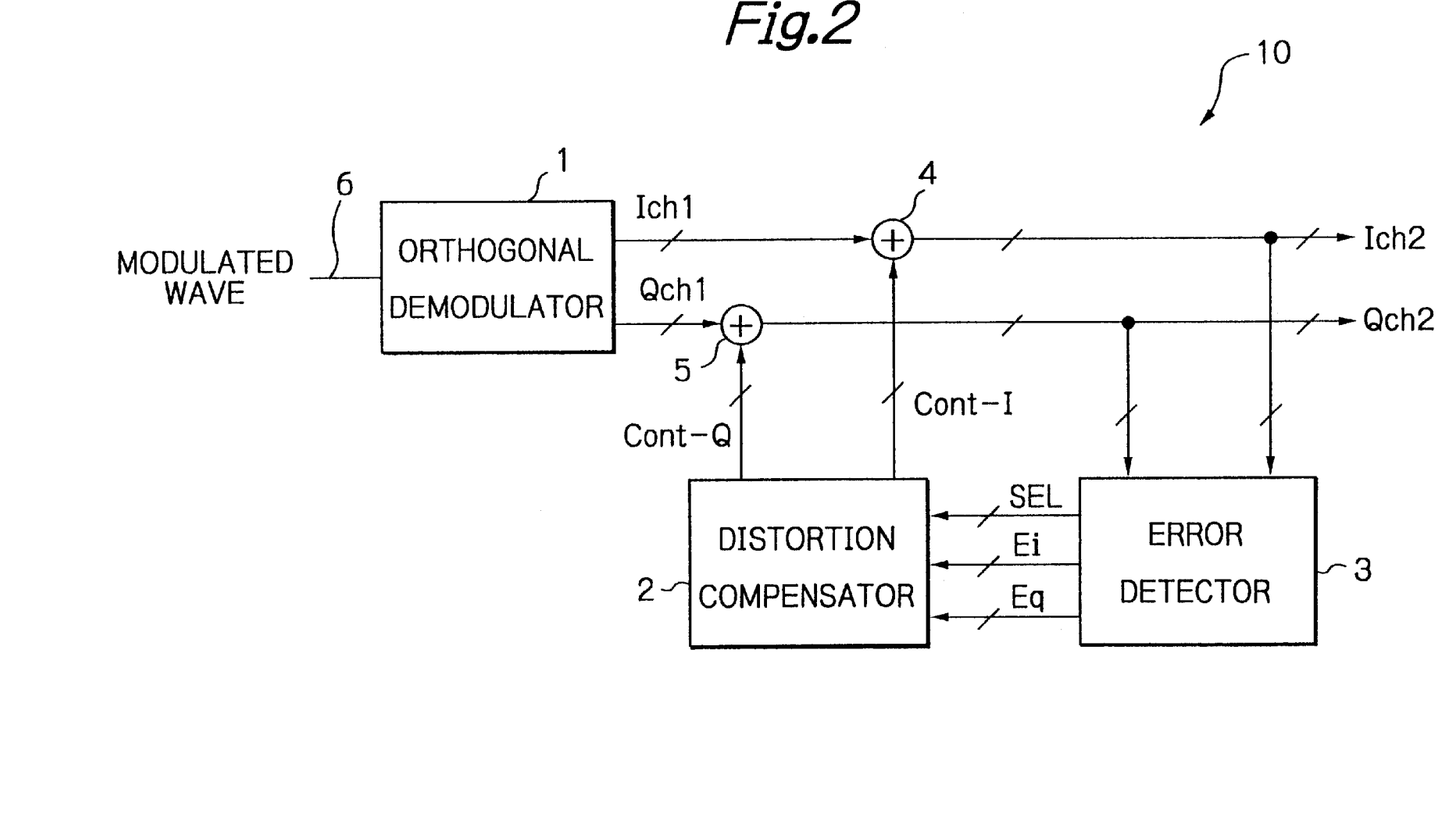
FIG. 2 is a schematic block diagram showing a demodulator embodying the present invention included in a digital radio communication apparatus.

Referring to FIG. 2, a demodulator embodying the present invention is shown and applied to a digital ratio communication apparatus. As shown, the demodulator, generally 10, includes an orthogonal demodulator 1, a distortion compensator 2, an error detector 3, and adders 4 and 6. A modulated wave 6 input to the demodulator 10 is assumed to be subjected to QPSK (Quadrature Phase Shift Keying), QAM (Quadrature Amplitude Modulation) or similar orthogonal modulation. In this sense, orthogonal components (channels) are represented by Ich and Qch as usual.

Assume that the modulated wave 6 input to the demodulator 10 is subjected to the influence of nonlinear distortion in a radio frequency (RF) band. Then, the outputs of the orthogonal demodulator 1 still contain the nonlinear distortion and cannot be reproduced at their original signal point even if noise and transmission path distortion are absent.

The error detector 3 outputs error information Ei and Eq, which will be described specifically later, representative of the shifts of the modulated signals from the original signal point. Also, the error detector 3 outputs signal point position information SEL (S) representative of the original signal point. The demodulator 10 determines the shifts of the signal points from the original signal point by using the above signals and then compensates for the linear distortion.

The orthogonal demodulator 1 executes orthogonal detection with the input demodulated wave 6 to thereby output baseband signals Ich1 and Qch1. The orthogonal demodulator 1 has a conventional configuration. Therefore, when the input modulated wave 6 is subjected to the influence of nonlinear distortion in the RF band, the demodulator 1 outputs demodulated signals containing the influence of nonlinear distortion.

The distortion compensator 2 receives the error information Ei and Eq and signal point position information SEL from the error detector 3. The distortion compensator 2 determines the shifts of the demodulated signals from the original signal point in accordance with the information Ei, Eq and SEL, thereby outputting control information or compensation information Cont-I and Cont-Q. The adders 4 and 5 respectively add the control information Cont-I and Cont-Q to the signals Ich1 and Qch2 output from the orthogonal demodulator 1. As a result, signals Ich2 and Qch2 free from the nonlinear distortion are obtained, as will be described more specifically later.

The distortion compensator 2 and error detector 3, which are unique to the illustrative embodiment, will be described in detail hereinafter.

Figure 3:
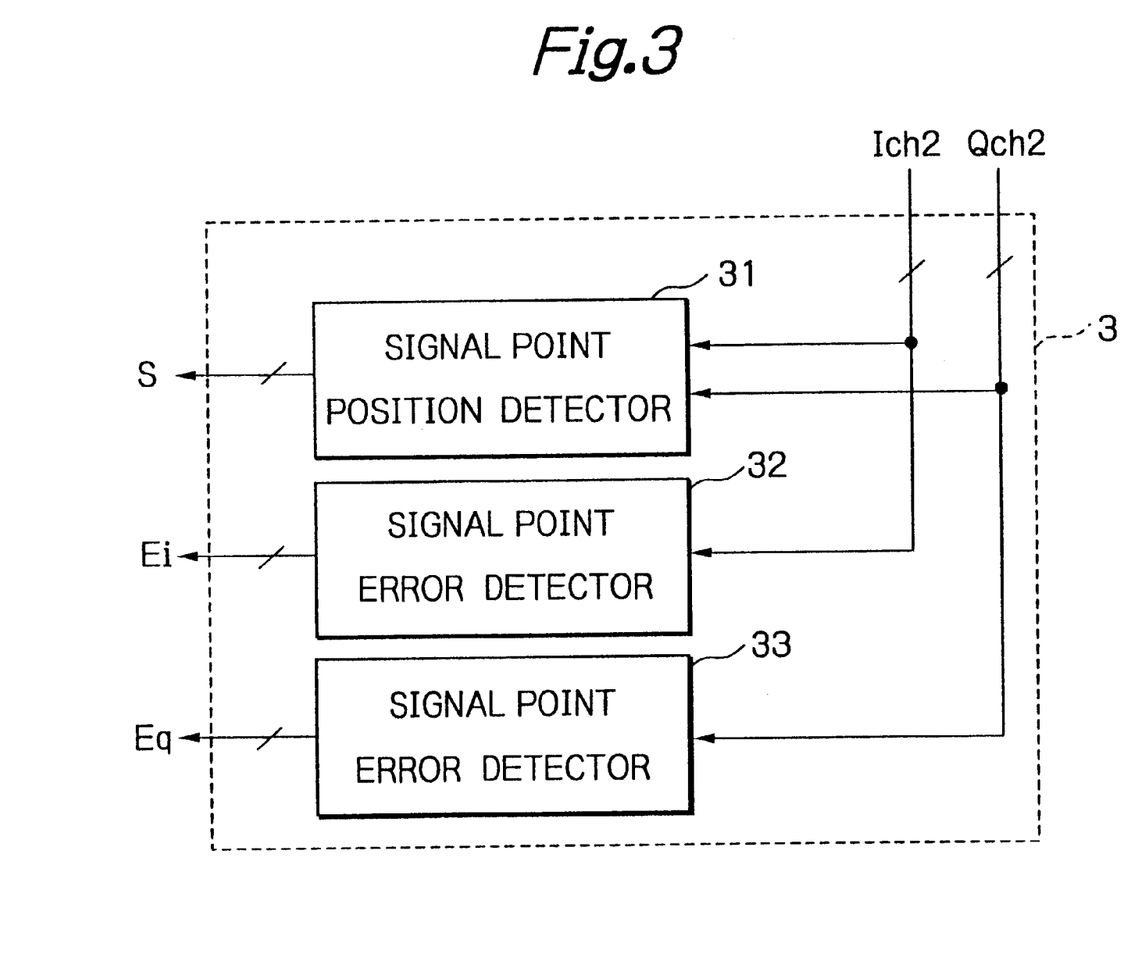
FIG. 3 is a schematic block diagram showing a specific configuration of an error detector included in the illustrative embodiment.

FIG. 3 shows a specific configuration of the error detector 3. As shown, the error detector 3 is generally made up of a signal point position detector 31 and two signal point error detectors 32 and 33. The signal point position detector 31 detects the signal point position of the modulated wave 6 and outputs the detected signal point position as signal point position information S (SEL). For example, assuming that the modulated wave 6 is subjected to 16QAM, then the signal point position detector 31 detects one of sixteen signal points at which the subject signal is positioned.

The signal point error detectors 32 and 33 respectively determines the shifts of the signals Ich and Qch from the original signal point and outputs the shifts as signal point error information Ei and Eq. In the illustrative embodiment, the error information each have a negative value if the input signal has a value greater than the original signal point or has a positive value if otherwise.

Figure 4:
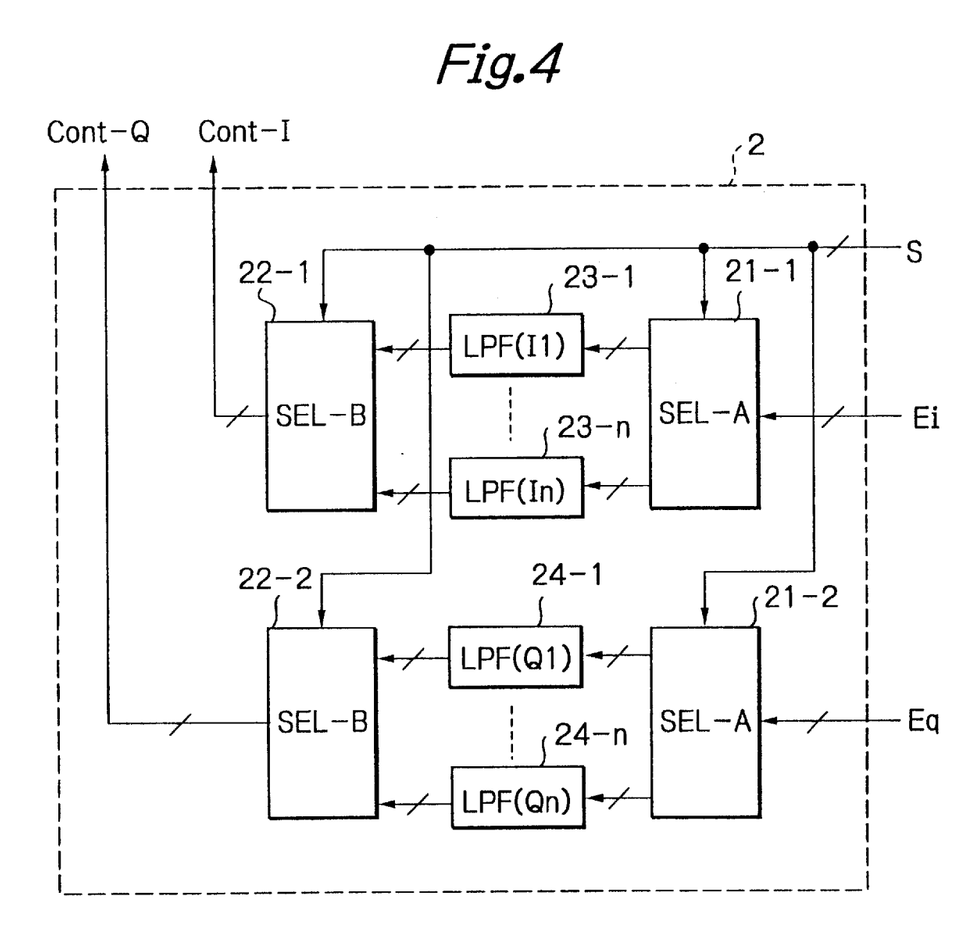
FIG. 4 is a schematic block diagram showing a specific configuration of a distortion compensator included in the illustrative embodiment.

FIG. 4 shows a specific configuration of the distortion compensator 2. As shown, the distortion compensator 2 includes two selectors 21-1 and 21-2 (SEL-A), two selectors 22-1 and 22-2 (SEL-B), n LPFs (Low-Pass Filters) 23-1 through 23-n (LPF-Ii through LPF-In). assigned to the I channel, and n LPFs 24-1 through 24-n assigned to the Q channel. The LPFs 23-1 through 23n and 24-1 through 24-n smooth input signals while memorizing them. This is why n LPFs are used for each of the I channel and Q channel.

Figure 5:
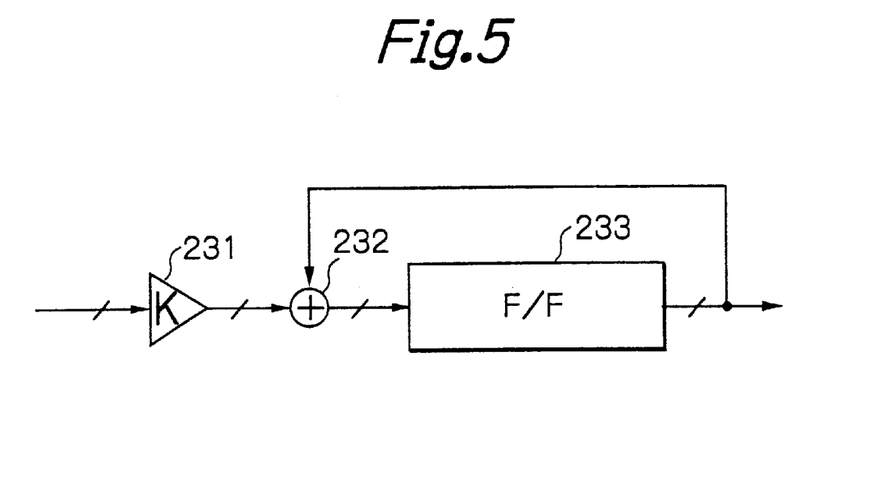
FIG. 5 is a schematic block diagram showing a specific configuration of a low-pass filter included in the illustrative embodiment.

FIG. 5 shows a specific configuration of one of the LPFs 23-1 through 23-n and 24-1 through 24-n. As shown, the LPF is made up of a fixed-gain amplifier 231, an adder 232, and a flip-flop (F/F) 233. To stabilize the operation of the LPF, the fixed-gain amplifier 231 compresses the input error information with a suitable constant K smaller than 1 (one). The adder 231 and F/F 233 memorize the output of the amplifier 231 as a smoothed value.

As shown in FIG. 4, the signal point position information S is input to the selectors 21-1, 21-2, 22-1 and 22-2. The selector 21-1 selects one of the LPFs 23-1 through 23-n to which the error information Ei should be input in accordance with the signal point position information S. Likewise, the selector 21-2 selects one of the LPFs 24-1 through 24-n to which the signal point information Eq should be input in accordance with the signal point position information S. The selector 22-1 selects one of the LPFs 23-1 through 23-n from which the control information Cont-I should be output in accordance with the signal point position information S. Likewise, the selector 22-2 selects one of the LPFs 24-1 through 24-n from which the control information Cont-Q should be output in accordance with the signal point position information S.

Figure 6:
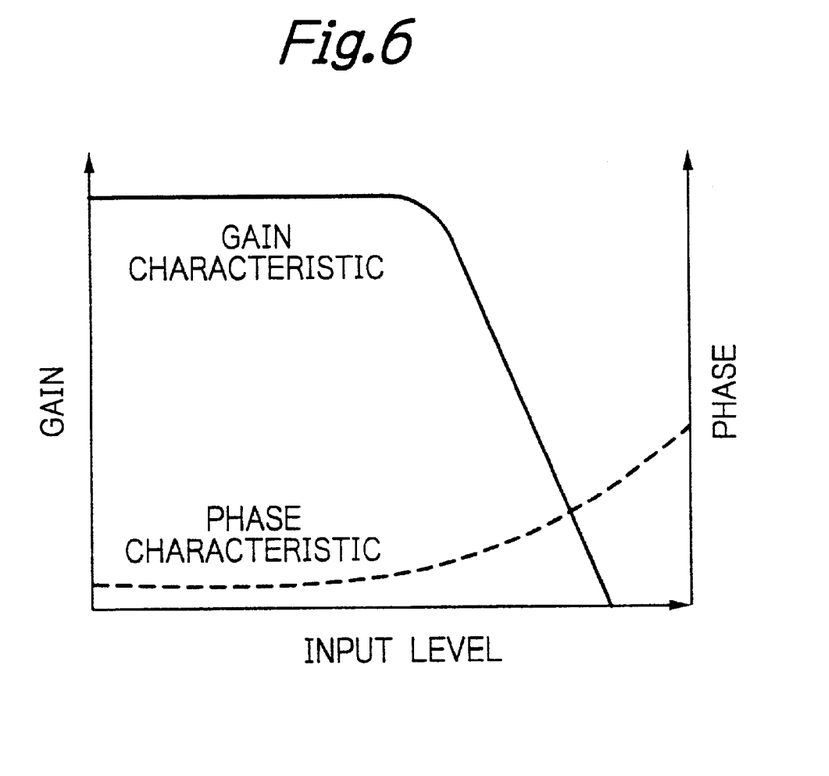
FIG. 6 is a graph showing specific nonlinear distortion characteristics particular to an amplifier.

Reference will be made to FIG. 6 for describing the nonlinear distortion characteristics of an amplifier. As shown, nonlinear distortion characteristics generally refer to an input level-to-gain characteristic and an input level-to-phase characteristic respectively indicated by a solid curve and indicated by a dashed curve in FIG. 6. As for the input level-to-gain characteristic, so long as the input level to the amplifier is lower than a certain value, the input and output remain in a linear relation. In this condition, the amplifier maintains a preselected gain. However, when the input level exceeds the certain value, the relation between the input and the output becomes nonlinear. Finally, the output level is fixed at a preselected value, i.e., the gain decreases despite the rise of the input level.

As also shown in FIG. 6, as for the phase characteristic, the phase varies in accordance with the input level when, e.g., the phase sequentially increases or when it sequentially decreases.

Figure 7:
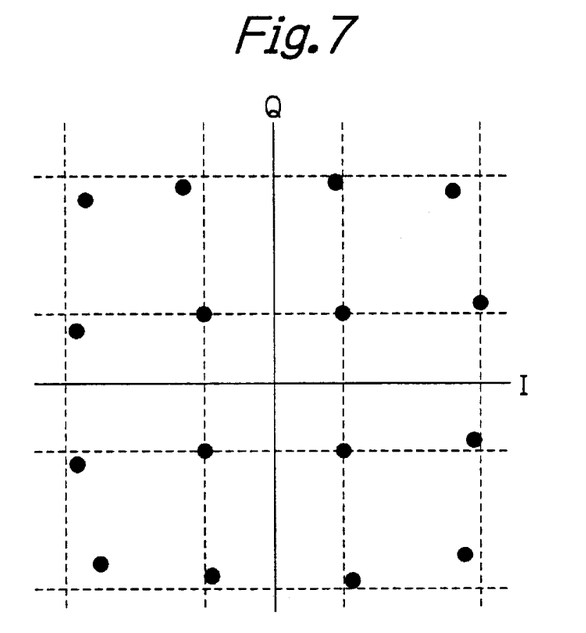
FIG. 7 shows the influence of nonlinear distortion in an I-Q plane.

Assuming 16 QAM. FIG. 7 shows the influence of nonlinear distortion of FIG. 6 in an I-Q plane. In FIG. 7, original signal points are expected to be positioned at points where vertical and horizontal dotted lines intersect each other. As shown, signal points remoter from the origin are higher in level when input to the amplifier due to the nature of QAM and therefore more reduced in amplitude relative to the original signal points.

Figure 8:
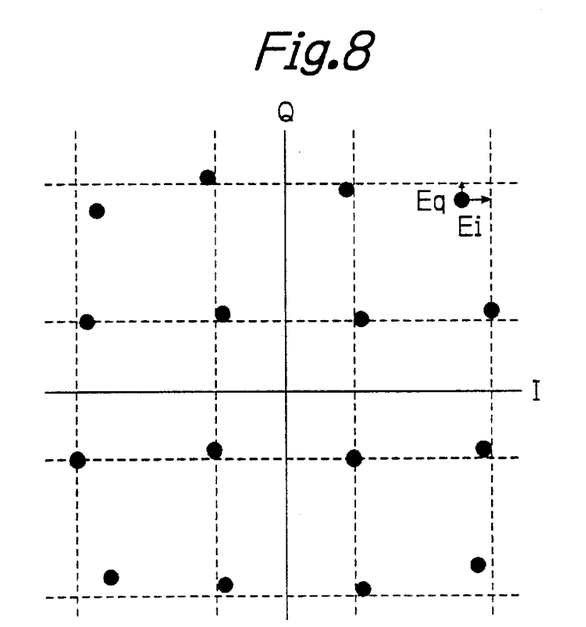
FIG. 8 shows error information Ei and Eq and signal point position information S to be output when signals containing the influence of nonlinear distortion are input to the error detector.

It is to be noted that FIG. 7 illustrates the influence of nonlinear distortion in a simple way for facilitating an understanding. In practice, a demodulator executes phase control such that phase offsets from the original signal points on average. Therefore, a demodulator lacking a nonlinear distortion compensator outputs a demodulated signal shown in FIG. 8. As shown in FIG. 8, in a demodulated signal derived from a modulated wave with nonlinear distortion, an error regularly occurs at every signal point from the original signal point.

Assume the initial stage in which the distortion compensator, FIG. 2, has not output optimal control information Cont-I or Cont-Q yet. Then, the signals Ich2 and Qch2, like the signals Ich1 and Qch1, contain the influence of nonlinear distortion. When the signals Ich2 and Qch2 are input to the error detector 3, the error detector 3 outputs the error information Ei and Eq and signal point position information S shown in FIG. 8.

The distortion compensator 2 determines, based on the signal point position information S, a signal point position to which the error information Ei and Eq relate, and then input the information Ei and Eq to the LPFs (23 and 24) corresponding to the identified signal point position. The LPFs (23 and 24) compress, smooth and then memorize the input error information. The outputs of the LPFs (23 and 24) are therefore not coincident with the error information Ei and Eq at the initial stage. However, a feedback loop including the adders 4 and 5, error detector 3 and distortion compensator 2 control the outputs of the LPFs (23 and 24) to the error information Ei and Eq little by little.

Further, the distortion compensator 2 determines the signal point position of the signals Ich1 and Qch1 in accordance with the signal point position information S to thereby select control information Cont-1 and Cont-Q to be output. The adders 4 and 5 respectively add the control information Cont-I and Cont-Q to the signals Ich1 and Qch1, thereby producing the outputs Ich2 and Qch2 free from nonlinear distortion.

As stated above, in the illustrative embodiment, the degree of the shift of a demodulated signal, e.g., an orthogonal demodulated signal from the original signal point position is determined. Subsequently, error information Ei and Eq relating to the orthogonal components and signal point position information S are produced. The error information Ei and Eq are compressed and smoothed to thereby generate control information or compensation information. The control information each are added to the demodulated signal. When the illustrative embodiment is applied to, e.g., a demodulator included in a digital radio communication system, it successfully compensates for nonlinear distortion ascribable to an amplifier and lying in the RF band.

While a transmitter has customarily compensated for nonlinear distortion, the illustrative embodiment causes a receiver to execute the compensation. This makes it needless to provide a transmitter with an orthogonal demodulator for nonlinear distortion compensation and therefore contributes to the cost reduction of the transmitter.

Moreover, the illustrative embodiment makes it needless to provide a demodulator with an analog circuit for distortion compensation. i.e., implements nonlinear distortion compensation simply by adding a digital processing circuit to the demodulator, facilitating the design of the apparatus inclusive of the demodulator. For example, even when nonlinear distortion characteristics vary due to the modification of an amplifier, necessary distortion compensation can be surely executed without a modulator or a demodulator being redesigned.

Figure 9:
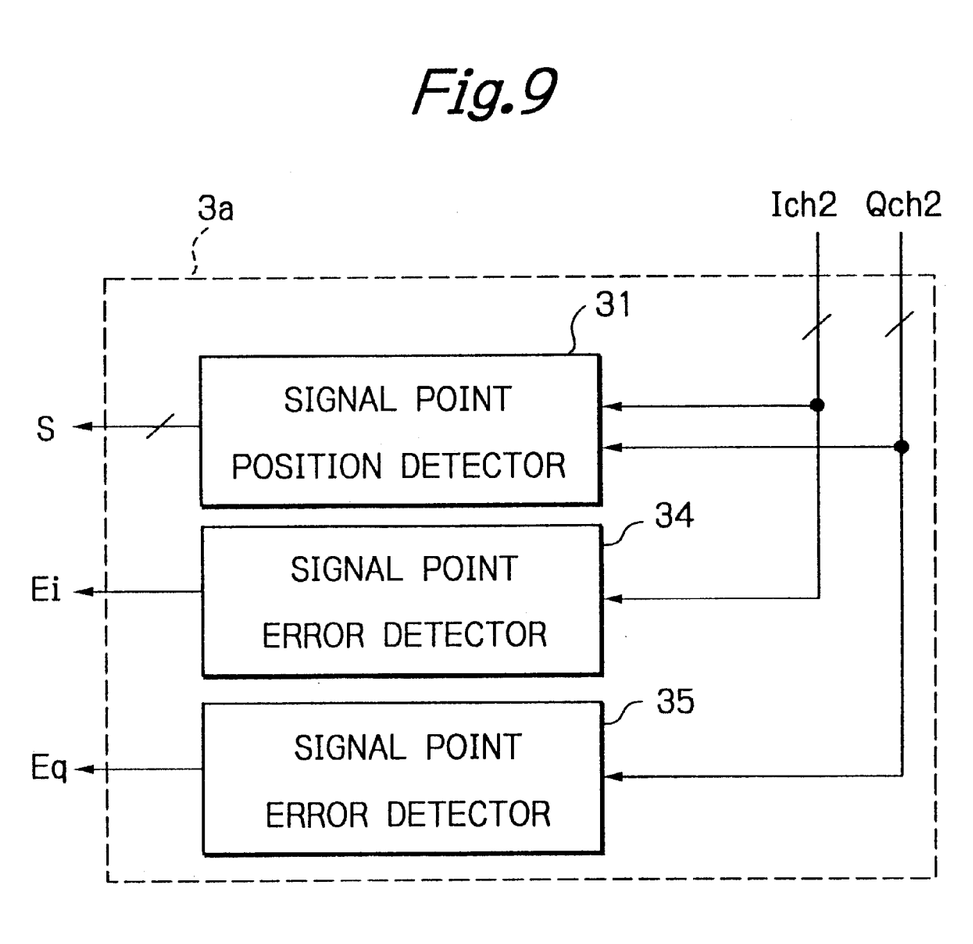
FIG. 9 is a schematic block diagram showing another specific configuration of the error detector.

FIG. 9 shows another specific configuration of the error detector 3. As shown, the error detector, labeled 3a, includes signal point error detectors 34 and 36 as well as the signal point position detector 31. The error detector 3a differs from the error detector 3 shown in FIG. 3 in that the signal point error detectors 34 and 35 each output a one-bit signal in place of a multibit signal. More specifically, the signal point error detectors 34 and 35 each output (logical) ZERO if the associated input signal has a value greater than the original signal point or output (logical) ONE if otherwise.

Figure 10:
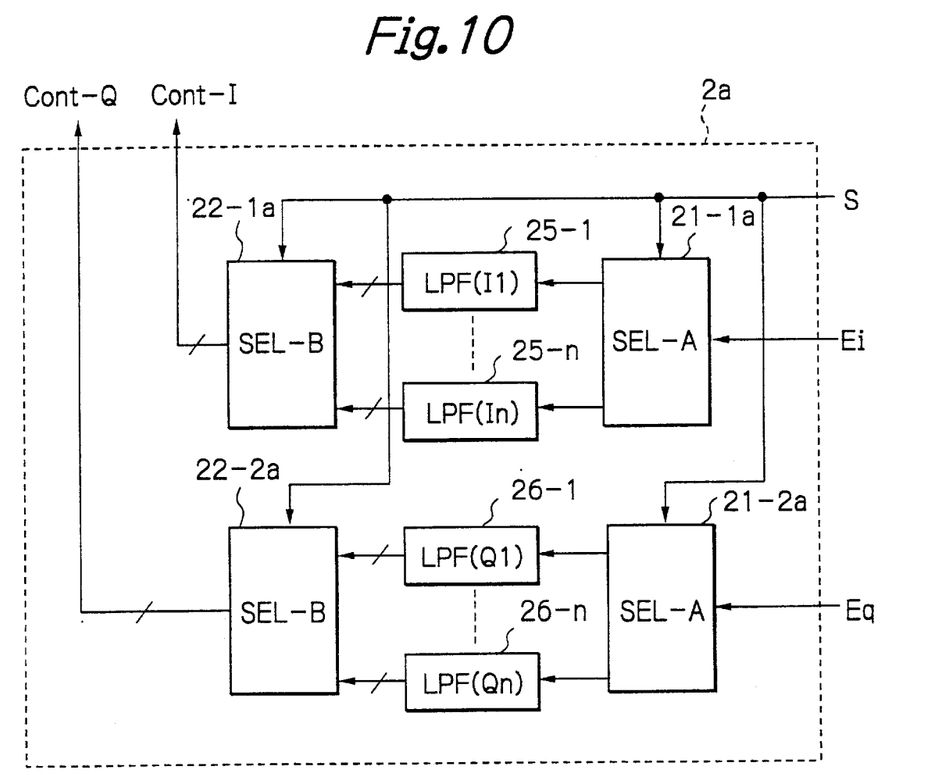
FIG. 10 is a schematic block diagram showing another specific configuration of the distortion compensator.

FIG. 10 shows another specific configuration of the distortion compensator 2. As shown, the distortion compensator, labeled 2a, also includes selectors 21-1a and 21-2a (SEL-A), selectors 22-1a and 22-2a (SEL-B). LPFs 25-1 through 25-n (LPF(I1) through LPF(In)) assigned to the I channel, and LPFs 26-1 through 26-n (LPF(Q1) through LPF(Qn)) assigned to the Q channel. The distortion compensator 2a differs from the distortion compensation 2 shown in FIG. 4 in that the input error information Ei and Eq are implemented as one-bit signals in place of multibit signals. Therefore, the signal input to each LPF is also a one-bit signal.

Figure 11:
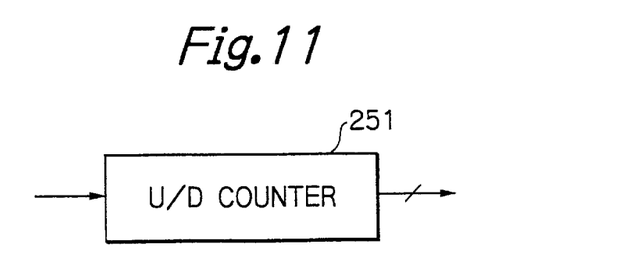
FIG. 11 is a schematic block diagram showing another specific configuration of the low-pass filter.

As shown in FIG. 11, each LPF included in the distortion compensator 2a, FIG. 10, is implemented only by an up-down (U/D) counter 251. The U/D counter 251 up-counts if the input one-bit signal is ONE or down-counts if it is ZERO.

The modification of the illustrative embodiment configured to deal with one-bit signals is simpler in configuration and smaller in circuit scale than the illustrative embodiment. Particularly, a number of LPFs present in the distortion compensator are implemented only by a U/D counter each, simplifying the configuration and reducing the circuit scale of the distortion compensator.

In summary, it will be seen that the present invention provides a demodulator installed in, e.g., a receiver included in a radio communication system and capable of compensating for nonlinear distortion with a simple circuit arrangement. Also, the demodulator can execute compensation only if a digital processing circuit, as distinguished from an analog circuit, is added thereto, and is therefore easy to design. Further, even when nonlinear distortion characteristics vary due to a modification of an amplifier, necessary compensation is achievable without redesigning a modulator or the demodulator. Moreover, even a radio communication system with such a simple demodulator can accurately compensate nonlinear distortion and is simplified itself.

Various modifications will become possible for those skilled in the art after receiving the teachings of the present disclosure without departing from the scope thereof.

What is claimed is:

1. A demodulator comprising:
   demodulating means for demodulating an input modulated wave to thereby output a demodulated signal;
   signal point position detecting means for detecting a signal point position of said demodulated signal on orthogonal coordinates;
   error detecting means for detecting a shift of the signal point position detected and an original signal point position of the demodulated signal;

outputting means for outputting first information representative of the shift and second information representative of the signal point position;

generating means for generating compensation information in accordance with said first information and said second information; and adding means for adding said compensation information to said demodulated signal to thereby output a sum signal;

wherein said sum signal is output from said demodulator as a distortion-compensated signal.

2. The demodulator as claimed in claim 1, wherein a processing path for executing detection of said shift based on the signal point position, generation of said compensation information and addition constitute a feedback loop for distortion compensation.

3. The demodulator as claimed in claim 2, wherein demodulation comprises orthogonal detection executed with a signal subjected to orthogonal modulation, said detecting means detects the signal point position with each of orthogonal components constituting the signal subjected to orthogonal modulation, and said error detecting means determines said shift with each of the orthogonal components.

4. The demodulator as claimed in claim 3, wherein said generating means comprises a plurality of low-pass filters (LPFs) equal in number to signal point positions signal component by signal component.

5. The demodulator as claimed in claim 4, wherein said LPFs each comprise a fixed-gain amplifier, an adder, and a flip-flop.

6. The demodulator as claimed in claim 4, wherein said LPFs each comprise an up-down (U/D) counter.

7. The demodulator as claimed in claim 3, wherein said first information and said second information each comprise a digital signal having a plurality of bits.

8. The demodulator as claimed in claim 3, wherein said first information comprises a one-bit digital signal while said second information comprises a digital signal having a plurality of bits.

9. In a radio communication system including a demodulator, said demodulator comprising:

demodulating means for demodulating an input modulated wave to thereby output a demodulated signal;

signal point position detecting means for detecting a signal point position of said demodulated signal on orthogonal coordinates;

error detecting means for detecting a shift of the signal point position detected and an original signal point position of the demodulated signal;

outputting means for outputting first information representative of the shift and second information representative of the signal point position;

generating means for generating compensation information in accordance with said first information and said second information; and adding means for adding said compensation information to said demodulated signal to thereby output a sum signal;

wherein said sum signal is output from said demodulator as a distortion-compensated signal.

10. The demodulator as claimed in claim 9, wherein a processing path for executing detection of said shift based on the signal point position, generation of said compensation information and addition constitute a feedback loop for distortion compensation.

11. The demodulator as claimed in claim 10, wherein demodulation comprises orthogonal detection executed with a signal subjected to orthogonal modulation, said detecting means detects the signal point position with each of orthogonal components constituting the signal subjected to orthogonal modulation, and said error detecting means determines said shift with each of the orthogonal components.

12. The demodulator as claimed in claim 11, wherein said generating means comprises a plurality of LPFs equal in number to signal point positions signal component by signal component.

13. The demodulator as claimed in claim 12, wherein said LPFs each comprise a fixed-gain amplifier, an adder, and a flip-flop.

14. The demodulator as claimed in claim 12, wherein said LPFs each comprise an up-down (U/D) counter.

15. The demodulator as claimed in claim 11, wherein said first information and said second information each comprise a digital signal having a plurality of bits.

16. The demodulator as claimed in claim 11, wherein said first information comprises a one-bit digital signal while said second information comprises a digital signal having a plurality of bits.

* * * * *